US006492996B1

(12) United States Patent
Macartney et al.

(10) Patent No.: US 6,492,996 B1
(45) Date of Patent: Dec. 10, 2002

(54) METHOD OF AND DISPLAY SYSTEM FOR MONITORING A SIGNALLING NETWORK

(75) Inventors: John William Forsyth Macartney, Edinburgh (GB); Richard John Easton, Midlothian (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/392,569

(22) Filed: Sep. 9, 1999

(30) Foreign Application Priority Data

Sep. 9, 1998 (EP) ............................................. 98307292

(51) Int. Cl.[7] ............................................... G06F 13/00
(52) U.S. Cl. ..................... 345/716; 345/618; 379/32.01
(58) Field of Search ........................... 379/32.01–32.05, 379/33, 35; 345/204, 618, 619, 716, 904, 737, 738, 854, 855; 340/825.06, 825.17; 709/224, 226

(56) References Cited

U.S. PATENT DOCUMENTS

| 4,775,973 | A | * | 10/1988 | Tomberlin et al. .......... 379/136 |
| 5,197,127 | A | * | 3/1993 | Waclawsky et al. ........ 395/200 |
| 5,903,724 | A | * | 5/1999 | Takamoto et al. ........ 395/200.3 |
| 6,041,352 | A | * | 3/2000 | Burdick et al. ............. 709/224 |
| 6,208,324 | B1 | * | 3/2001 | Sundstrom et al. ......... 345/115 |

OTHER PUBLICATIONS

Modarressi, et al, "An Overview of Signaling System No. 7," *Proceedings of the IEEE,* vol. 80 (1992), Apr., No. 4, New York.

Kuhnert, H–P, et al, Ueberwachungs—und Managementsystem Fuer Netze Mit Dem Zeichengabesystem NR. 7, *NTZ Nachrichten Technische Zeitschrift,* 49 (1996) Feb., No. 2, Berlin, DE.

Yegenoglu, Ferit, et al, "Transaction Capabilities Application Part and Intelligent Network Services," *Discovering a New World of Communications,* Jun. 14–18, 1992, vol. 2, pp. 582–586.

Claxton, K. L. et al, "Managing Information for Accunet Services," AT&T Technology, vol. 6, No. 1, Jan. 1, 1991, pp. 12–15.

* cited by examiner

Primary Examiner—Dennis-Doon Chow

(57) ABSTRACT

Telephone traffic is displayed on a screen so a message source and a message destination are represented by lines, such as vertical lines, for example, each with a label denoting its location. An arrow joining the location lines points in the same direction as the message and has an associated label indicating message identity. Further message source and destination locations are denoted by further lines, such as vertical lines, for example, only if the location is additional to a location already displayed. Otherwise an already displayed line denotes the relevant location. Further labelled arrows denote further messages. Each successive monitored message is denoted by a further arrow at a lower place on the display than the arrows denoting previous messages so successive items are added in a non-overlapping bottom-down manner. The resultant display is a telephone network traffic pictorial representing the occurrence and progress of monitored messages selected for fault analysis, call-tracing, and fraud prevention.

13 Claims, 3 Drawing Sheets

METHOD OF AND DISPLAY SYSTEM FOR MONITORING A SIGNALLING NETWORK

This invention relates to a method of and a display system for monitoring a signalling network, and relates more particularly but not exclusively to a method and display system for the monitoring of telephone network traffic.

In contemporary systems for monitoring telephone network traffic, information about a "call model" (i.e. sequence, direction, type, source and destination of each message) is generally in the form of string of alpha-numeric characters, and is displayed as such on a monitor screen (i.e. the display screen of a video display unit). An operator may find it difficult to interpret such data, particularly as the data are cryptic, frequently complex and covering a wide range of variables, and may be changing rapidly. It has been realised that the traffic data can be more easily interpreted if at least basic traffic parameters were presented in a logical graphic form.

According to a first aspect of the present invention there is provided a method for displaying graphically the inter-relationship of a sequence of events in a signalling network, the method comprising deriving parameters of a said events from said network and displaying said parameters by means of respective lines on a display.

According to a-second aspect of the present invention there is provided a method for monitoring a signalling network, the method comprising receiving information in the form of data representative of the source and the destination of a monitored message carried by the signalling network, processing such received data to derive a display-driving signal for visual data display means which display-driving signal causes the display means to display a first line indicative of the source of the monitored message, and to display a second line indicative of the destination of the monitored message, the display-driving signal additionally causing the display means to display a transverse arrow linking the two lines from the source to the destination as indicated by the direction of the arrow.

Further according to the present invention there is provided a display system for monitoring a signalling network, the display system comprising a visual data display means and further comprising information processing means coupled to a traffic monitoring system to receive therefrom information comprising data representative of the source and the destination of a monitored message carried by the telephone network, characterised in that the information processing means functions to process such received data to derive a display-driving signal for the visual data display means which display-driving signal causes the display means to display a first line indicative of the source of the monitored message, and to display a second line indicative of the destination of the monitored message, the display-driving signal additionally causing the display means to display a transverse arrow linking the two lines from the source to the destination as indicated by the direction of the arrow.

The first and second lines are preferably displayed on the display means as substantially vertical lines, the lines preferably being mutually laterally displaced on the display means so as not to overlie one another and so as to be visually distinct. The display-driving signal preferably further causes the display means to display a label against each of the lines, each label being indicative of the respective locations of the source and of the destination. The display-driving signal preferably also causes the display means to label the arrow with an indication of the message identity and/or other selected message parameters or attributes.

The transverse arrow preferably extends from the source line to the destination line. The arrow may be horizontal or be such that the head of the arrow (indicating the message destination) is lower than the tail of the arrow (indicating the message source).

The information processing means is preferably such as to receive from the traffic monitoring system information comprising data representative of the source and the destination of a further monitored message subsequently carried by the telephone network, the information processing means functioning to process such received data to determine if the location of the source of the further monitored message coincides with the location of either the source or the destination of the or each message previously monitored and still displayed, and if there is no coincidence, to derive a further display-driving signal which causes the display means to display a further line indicative of the source of the further monitored message, the information processing means also functioning to process the received data concerning the further monitored message to determine if the location of the destination of the further monitored message coincides with the location of either the source or the destination of the or each message previously monitored and still displayed, and if there is no coincidence, to derive a further display-driving signal which causes the display means to display a further line indicative of the destination of the further monitored message, the further display-driving signals additionally causing the display means to display a further transverse arrow linking the two lines respectively denoting the source and the destination of the further monitored message, the arrow linking these two lines from the source to the destination as indicated by the direction of the arrow.

The or each such further line is preferably displayed on the display means as a substantially vertical line, and the or each such further line is preferably displayed together with an adjacent label indicative of the location of the source or destination of the further monitored message. The further display-driving signal preferably also causes the display means to label the further arrow with an indication of the identity and/or other selected parameters of the further message.

The further transverse arrow should normally not overlie the or any of the transverse arrow(s) still displayed in respect of previous message(s), and the further transverse arrow is preferably displayed below the or each transverse arrow still displayed whereby transverse arrows are added to the display in a non-overlapping manner.

Embodiments of the invention will now be described by way of example, with reference to the accompanying drawings wherein.

Figure 1:
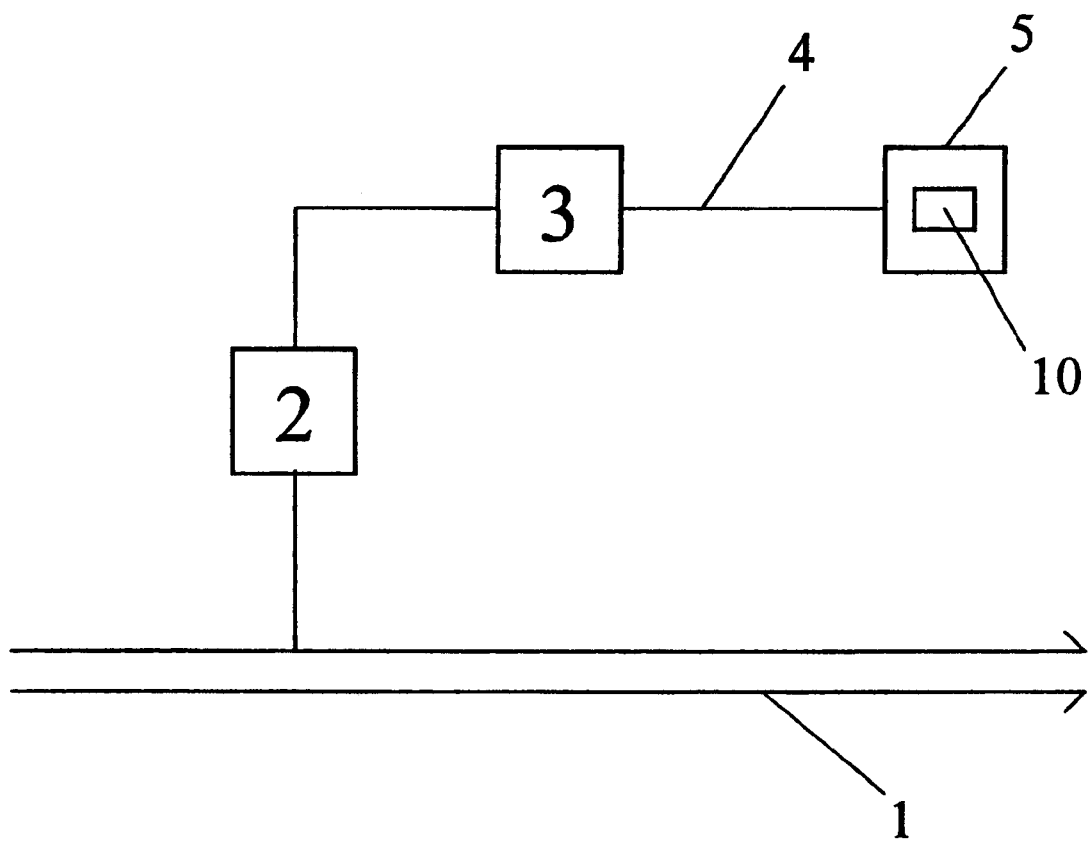
FIG. 1 is a schematic flow diagram illustrating the invention.

Referring first to FIG. 1, information relating to signalling network 1 is received by a traffic monitoring unit 2. The information may comprise data representative of the source and destination of a message carried by the signalling network as well as other signal parameters or attributes. The data is passed to a processing unit 3 to generate a display driving signal 4 which has the necessary information to generate a display on a display screen 10 of a suitable display unit 5.

Figure 2:
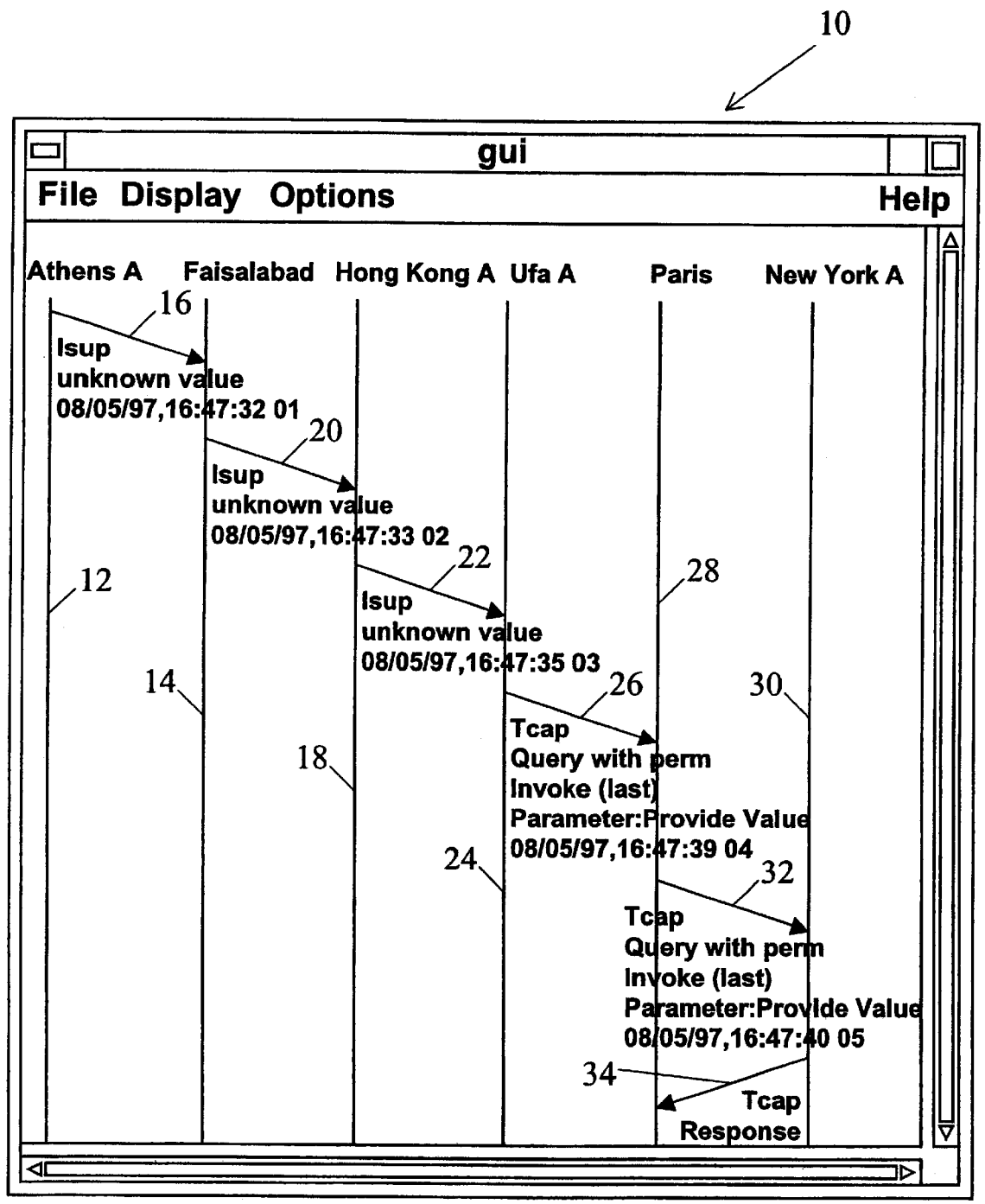
FIG. 2 is a copy of a typical display screen.
Figure 3:
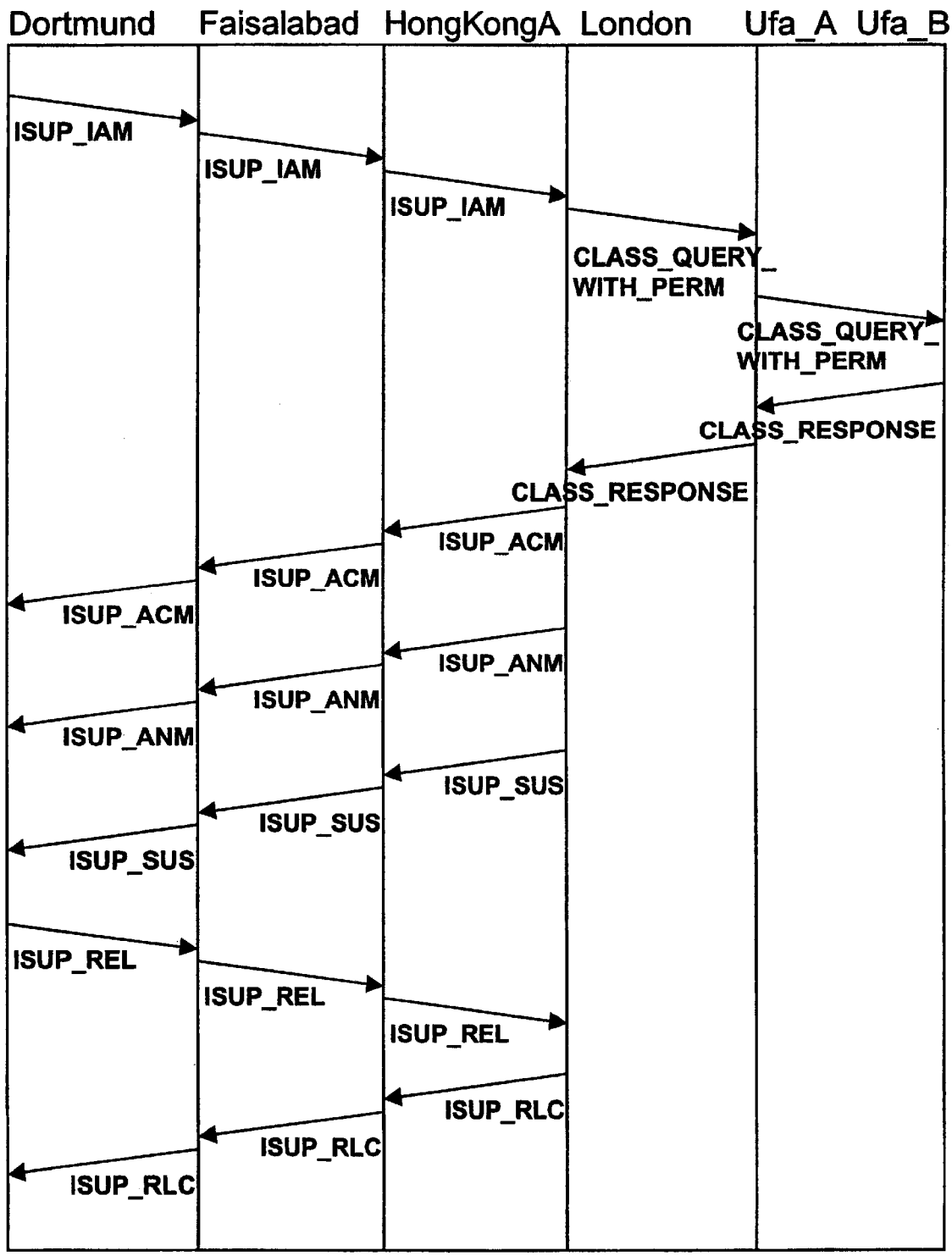
FIG. 3 is a diagram of a modified form of display.

Referring now to FIG. 2, this is a pictorial copy of a computer screen 10 forming part of a signalling network being a telephone network traffic monitoring system, and displaying a call-tracing message sequence diagram in accordance with the invention. Starting at the left, the first message is sourced at an international telephone switch denoted "Athens A" and has a destination at another international telephone switch denoted "Faisalabad". This source and destination of the first message are denoted by first and second vertical lines and 14 respectively, with the respective location labels (switch names) immediately above. these lines. The first message is denoted by a first arrow 16 extending mainly horizontally and, if desired, slightly downwardly from the first line 12 (source) to the second line 14 (destination). Immediately below the first arrow 16 is a label denoting the type of message ("Isup"), the status of a pre-selected parameter ("unknown value"), and a line of numerals denoting date, time, and message number.

The second message originates at "Faisalabad", with a destination at the "Hong Kong A" international telephone switch. Since the source of the second message is a location that is already on the screen 10, no new line is generated or displayed, and the second message source is therefore denoted by the pre-existing line 14. However, the destination of the second message is a location not previously displayed on the screen 10, and accordingly is depicted by a third vertical line 18 with the location label ("Hong Kong A") immediately above the top of the line 18. The second message is denoted by a second arrow 20 extending mainly horizontally and slightly downwardly from the second line 14 (source) to the third line 18 (destination). Immediately below the second arrow 20 is a label denoting the type of message in the second message, etc. similarly to the label denoting the type of message in the first message. (The second message may be in fact the first message transferred through "Faisalabad" from "Athens A" to "Hong Kong A", but for administrative, technical and revenue reasons, transferred messages-are treated as distinct messages even though their contents are identical).

Similarly, the message is transferred on again (as denoted by an arrow 22) from "Hong Kong A" switch to "Ufa A" switch (respectively denoted by the pre-existing vertical line 18, and a new vertical line 24), call labelling being undertaken as before by the screen label immediately below the arrow 22.

At "Ufa A", the message first sourced at "Athens A" results in a modified form of message ("Tcap Query") as denoted by an arrow 26 and forwarded to an intermediate destination, namely "Paris" as denoted by a vertical line 28. The "Tcap Query" message is forwarded from "Paris" (as source, and denoted by the pre-existing line 28) to a final destination at "New York A" (denoted by a new vertical line 30). The final transfer of the message is denoted by a message arrow 32, which (like all the other arrows 16, 20, 22 and 26) may slope slightly downwards from message source to message destination (the vertical lines 12, 14, 18, 24, 28 and 30).

Thus the screen 10 displays message sources and destinations in a logical and visually distinct sequence (from left to right), with successive messages also being displayed in chronological sequence (from top to bottom)., the message directions being made visually explicit by the arrows (the messages heading in the direction of the arrow heads) as visually enhanced by the downslope (top to bottom component) of each arrow. Such logical graphical (i.e. pictorial) presentation of data is much clearer than successive lines and paragraphs of alphanumeric text only, and the information can be assimilated by an operator "at a glance". As well as presenting successive steps in a sequence, overall trends become much easier to see and to comprehend.

When messages transverse part of a currently displayed traffic route, but in a direction which is opposite to that previously taken, the display system functions with equal facility. This is depicted in FIG. 1 as the evocation in "New York A" (vertical line 30) of a message 34 ("Tcap Response") in response to the previous incoming message 32 ("Tcap Query"). The response message 34 is initially sourced in "New York A" and transmitted to a first destination at "Paris". Since both "New York A" and "Paris" have already been depicted on the screen 10 by the respective vertical lines 30 and 28, no new lines are required to depict the source and destination of "Tcap Response" message 34, these locations coinciding with locations already depicted and still on display. The message arrow 34 now runs from right to left and may still slope downward from source (line 30) to destination (line 28), and also appears vertically beneath all other arrows denoting previous messages, thus preserving the on-screen correlation of time progressing from top to bottom (i.e. an earlier event is always displayed above a later event, whilst horizontal differences are reserved for denoting different locations).

If the "Tcap Response" message 34 were to be forwarded on from "Paris", the whole display on the screen 10 preferably scrolls or steps upward, deleting the message 16 but making room at the bottom of the display for the new message (not actually shown in FIG. 1).

Similarly, further sources and/or destinations not coincident with those currently filling the screen 10 from left to right can cause the display to scroll or jump left or right to clear a marginal strip for a new vertical line and its location label. Alternatively, the display may be re-arranged to compress the spacing of the lines to permit more information to be displayed on a single screen.

FIG. 2 shows an exemplary display 100 which is built-up in successive steps as was the exemplary display 10 described above, the display 100 having a slightly different selection of source/destination locations (denoted by the vertical lines in FIG. 2, with their associated labels). Compared to the display 10, the display 100 has a somewhat greater number of successive messages and therefore a greater vertical extent. Displayed message identities and other parameters also differ somewhat in the display 100 from those selected to be displayed in the previous display 10.

While the display system will function in monochrome, the facility to present clear and logical visual information to the operator may be enhanced by the selective use of colors in the display.

Other modifications and variations can be adopted without departing from the scope of the invention as defined in the appended claims.

What is claimed is:

1. A method for monitoring a signalling network, the method comprising receiving information in the form of data representative of the source and the destination of a monitored message carried by the signalling network, processing such received data to derive a display-driving signal for visual data display means which display-driving signal causes the display means to display a first line indicative of the source of the monitored message, and to display a second line indicative of the destination of the monitored message, the display-driving signal additionally causing the display means to display a transverse arrow linking the two lines from the source to the destination as indicated by the direction of the arrow.

2. A method as claimed in claim 1, wherein the display-driving signal causes each of said first and second lines to be displayed on the display means as substantially parallel vertical lines.

3. A method as claimed in claim 2, wherein the display-driving signal causes the lines to be mutually laterally displaced on the display means so as not to overlie one another and so as to be visually distinct.

4. A method as claimed in claim 1, wherein the display-driving signal further causes the display means to display a label adjacent each said line, each said label being indicative of the respective locations of the source and of the destination.

5. A method as claimed in claim 4, wherein the transverse arrow descends from the source line to the destination line such that a first end of the arrow is lower than a second end of the arrow.

6. A method as claimed in claim 1, wherein the display-driving signal also causes the display means to label the arrow with an indication of the message identity and/or other selected message parameters.

7. A method as claimed in claim 1, wherein the information received from the signalling network includes data representative of the source and the destination of a further monitored message subsequently carried by the signalling network, processing such received data to determine if the location of the source of the further monitored message coincides with the location of either the source or the destination of the or each message previously monitored and still displayed, and if there is no coincidence, deriving a further display-driving signal which causes the display means to display a further line indicative-of the source of the further monitored message, and processing the received data concerning the further monitored message to determine if the location of the destination of the further monitored message coincides with the location of either the source or the destination of the or each message previously monitored and still displayed, and if there is no coincidence, deriving a further display-driving signal which causes the display means to display a further line indicative of the destination of the further monitored message, the further display-driving signals additionally causing the display means to display a further transverse arrow linking the two lines respectively denoting the source and the destination of the further monitored message, the arrow linking these two lines from the source to the destination as indicated by the-direction of the arrow.

8. A method as claimed in claim 7, wherein the further display-driving signal causes each said further line to be displayed on the display means as a substantially vertical line.

9. A method as claimed in claim 7, wherein the further display-driving signal causes each said further line to be displayed on the display means together with an adjacent label indicative of the location of the source or destination of the further monitored message.

10. A method as claimed in claim 7, wherein the further display-driving signal also causes the display means to label the further arrow with an indication of the identity and/or other selected parameters or attributes of the further message.

11. A method as claimed in claim 7, wherein the further transverse arrow does not overlie the or any of the transverse arrow(s) still displayed in respect of previous message(s), and-in that the further transverse arrow is displayed below the or each transverse arrow still displayed whereby transverse arrows are added to the display in a non-overlapping bottom-down manner.

12. A display system for monitoring a signalling network, the display system comprising a visual data display means and further comprising information processing means coupled to a traffic monitoring system to receive therefrom information comprising data representative of the source and the destination of a monitored message carried by the signalling network, wherein the information processing means functions to process such received data to derive a display-driving signal for the visual data display means which display-driving signal causes the display means to display a first line indicative of the source of the monitored message, and to display a second line indicative of the destination of the monitored message, the display-driving signal additionally causing the display means to display a transverse arrow linking the two lines from the source to the destination as indicated by the direction of the arrow.

13. A display system as claimed in claim 12, wherein the information processing means processes data representative of the source and destination of a further monitored message subsequently carried by the signalling network.

* * * * *